(12) United States Patent
Riepenhoff

(10) Patent No.: US 9,674,326 B2
(45) Date of Patent: Jun. 6, 2017

(54) ARRANGEMENT WITH A HANDSET DEVICE, AN INTERFACE UNIT AND A HEARING DEVICE

(71) Applicant: SONOVA AG, Staefa (CH)

(72) Inventor: Matthias Riepenhoff, Zurich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/112,663

(22) PCT Filed: Jan. 24, 2014

(86) PCT No.: PCT/EP2014/051436
§ 371 (c)(1),
(2) Date: Jul. 19, 2016

(87) PCT Pub. No.: WO2015/110172
PCT Pub. Date: Jul. 30, 2015

(65) Prior Publication Data
US 2016/0337493 A1 Nov. 17, 2016

(51) Int. Cl.
H04M 1/21 (2006.01)
H04M 1/02 (2006.01)
H04R 25/00 (2006.01)
H01R 24/58 (2011.01)

(52) U.S. Cl.
CPC .......... H04M 1/21 (2013.01); H04M 1/0258 (2013.01); H04R 25/558 (2013.01); H01R 24/58 (2013.01); H04M 2250/04 (2013.01); H04R 2225/55 (2013.01)

(58) Field of Classification Search
CPC .............................. H04M 1/21; H04M 1/0258
See application file for complete search history.

(56) References Cited

U.S. PATENT DOCUMENTS

| 2011/0144778 A1 | 6/2011 | Fung et al. | |
|---|---|---|---|
| 2011/0319130 A1* | 12/2011 | Lee | H04M 1/72572 455/556.1 |
| 2012/0293001 A1* | 11/2012 | Chan | G07F 7/0873 307/66 |

FOREIGN PATENT DOCUMENTS

| WO | WO-2008/071807 | 6/2008 |
| WO | WO-2008/072814 | 6/2008 |

OTHER PUBLICATIONS

International Search Report and Written Opinion received in International Application No. PCT/US2014/051436, dated Sep. 12, 2014.

* cited by examiner

*Primary Examiner* — Tuan H Nguyen
(74) *Attorney, Agent, or Firm* — ALG Intellectual Property, LLC

(57) ABSTRACT

A handset device and an interface unit used to transmit at least one of a command signal and an audio signal to a hearing device by way of a wireless connection are disclosed. The handset device has an audio output and is configured to transmit a power signal configured to power the interface unit to the interface unit by way of a wired connection connecting the audio output of the handset device with an audio input of the interface unit. The handset device is also configured to transmit the command signal and/or the audio signal to the interface unit by way of the wired connection. In certain embodiments, the audio signal and at least one of the command signal and the power signal have pre-assigned and non-overlapping frequency ranges.

20 Claims, 7 Drawing Sheets

US 9,674,326 B2

ARRANGEMENT WITH A HANDSET DEVICE, AN INTERFACE UNIT AND A HEARING DEVICE

TECHNICAL FIELD OF THE INVENTION

The present invention is related to an arrangement comprising a handset device, an interface unit and a hearing device as well as to the interface unit.

DESCRIPTION OF THE RELATED ART

Today, many people use a Smartphone. A hearing impaired person has difficulties to use the earphones or headsets coming with the Smartphone because he is wearing a hearing aid. Therefore and also due to his hearing impairment, the hearing impaired person cannot take full advantage of the audio quality of the Smartphone. Usually, the hearing impaired person does not perceive the high frequencies due to a hearing loss. Often, the hearing impaired person needs to carry a dedicated accessory with him to control the hearing aid or to connect the hearing aid with the Smartphone during a phone call, for example. In these cases, the accessory comprises wireless transceivers to communicate with the hearing aid as well as with the Smartphone. Consequently, the accessory must comprise a battery, which has to be exchanged or recharged from time to time, thus creating additional inconvenience to the hearing aid user. In addition, it is disadvantageous for a user of a hearing aid to carry two devices, namely a Smartphone and the accessory. Due to the independent operation of the Smartphone and the accessory, monitoring the batteries of the two carry-on device is necessary. This is particularly cumbersome for hearing aid users who also have to monitor the battery of the hearing aid.

Known related art is described in WO 2008/071807 A2, GB 2 484 943 and US 2011/144 778, for example.

Therefore, it is an object of the present invention to provide an arrangement comprising a handset device and a hearing device that does not have the above-mentioned disadvantages.

SUMMARY OF THE INVENTION

In the context of the present invention, the term "hearing device" is defined not only as hearing aid that is used to improve the hearing of hearing impaired patients but also as any communication device or as hearing protection devices, wherein hearing aids may also be implantable.

First, the present invention is directed to an arrangement comprising:
a handset device with an audio output,
an interface unit comprising an audio input and a first wireless transceiver,
a hearing device comprising an input transducer, an output transducer, a signal processing unit and a second wireless transceiver, the signal processing unit being operatively connected to the input transducer, the output transducer, the signal processing unit and the second wireless transceiver,
a wired connection for connecting the audio output with the audio input,
a wireless connection for wirelessly interconnecting the first and the second wireless transceiver at least temporally,
wherein the wired connection is used to transmit a power signal to power the interface unit as well as to transmit at least one of a command signal and an audio signal to the interface unit, and wherein the wireless connection is used to transmit at least one of the command signal and the audio signal to the hearing device.

The invention is particularly beneficial for hearing impaired people, it can however advantageously be used in a communication system, especially in combination with hearing protection devices when a user is wearing protective earplugs, which comprise communication means and the audio frequency range can be reduced, for example to frequencies below 10 kHz.

In an embodiment of the arrangement according to the present invention, the handset device is a telephone handset, in particular a Smartphone.

In further embodiments of the arrangement according to the present invention, a standardized audio plug and a corresponding socket are used for the wired connection between the handset device and the interface unit.

In further embodiments of the arrangement according to the present invention, wherein the wired connection comprises a single wire and a reference wire for transmitting the power signal as well as for transmitting at least one of the command signal and the audio signal to the interface unit.

In still further embodiments of the arrangement according to the present invention, the wired connection comprises a first wire, a second wire and a reference wire, the first wire being used for transmitting the audio signal, and the second wire being used for transmitting the power signal as well as the command signal to the interface unit.

In further embodiments of the arrangement according to the present invention, wherein the wired connection comprises a first wire, a second wire and a reference wire, the first wire being used for transmitting the power signal as well as at least one of the audio signal and the command signal, and the second wire being used for transmitting a further power signal as well as at least one of a further audio signal and the command signal.

In further embodiments of the arrangement according to the present invention, wherein the audio signal and at least one of the command signal and the power signal have pre-assigned non-overlapping frequency ranges.

Second, the present invention is directed to an interface unit comprising:
an audio input for connecting to a handset device via a wired connection, the audio input comprising a power signal as well as at least one of a command signal and an audio signal,
a wireless transceiver for connecting to a hearing device via a wireless connection,
an input circuit that is operatively connected to the audio input as well as to the wireless transceiver,
wherein the input circuit is adapted to separate the power signal as well as at least one of the command signal and the audio signal, the power signal being used to provide electrical energy and the at least one of the command signal and the audio signal being provided to the wireless transceiver.

An embodiment of the interface unit according to the present invention, the wireless transceiver is used to transmit at least one of the command signal and the audio signal.

In further embodiments of the interface unit according to the present invention, the audio input is adapted for connecting to an audio output of a Smartphone or the like.

In further embodiments of the interface unit according to the present invention, the audio input is a standardized audio plug.

In further embodiments of the interface unit according to the present invention, the wired connection comprises a single wire and a reference wire for transmitting the power signal as well as for transmitting at least one of the command signal and the audio signal.

In still further embodiments of the interface unit according to the present invention, the wired connection comprises a first wire, a second wire and a reference wire, the first wire being used for transmitting the audio signal to the interface unit, and the second wire being used for transmitting the power signal as well as the command signal.

In further embodiments of the interface unit according to the present invention, the wired connection comprises a first wire, a second wire and a reference wire, the first wire being used for transmitting the audio signal, the power signal as well as the command signal, and the second wire being used for transmitting a further audio signal, a further power signal to power the interface unit, and optionally the command signal.

In further embodiments of the interface unit according to the present invention the audio signal and at least one of the command signal and the power signal have pre-assigned non-overlapping frequency ranges.

It is expressly pointed out that the above-mentioned embodiments can be arbitrarily combined. Only those combinations are excluded that would result in a contradiction.

BRIEF DESCRIPTION OF THE DRAWINGS

The present invention is further illustrated by way of exemplified embodiments shown in drawings and described in detail. It is pointed out that these embodiments are for illustrative purposes only and shall not confine the present invention.

DETAILED DESCRIPTION OF THE INVENTION

Figure 1:
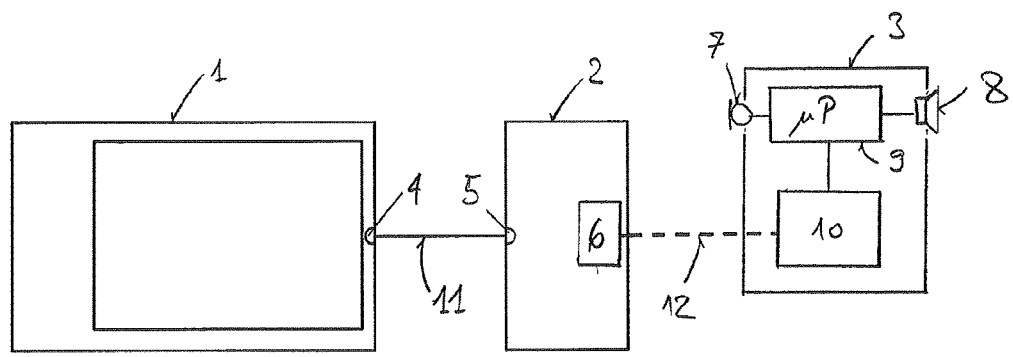
FIG. 1 schematically shows a block diagram of the arrangement according to the present invention with a handset device, an interface unit and a hearing device, FIG. 2 schematically shows a block diagram of a first embodiment of the handset device shown in FIG. 1, FIG. 3 schematically shows a block diagram of a second embodiment of the handset device of FIG. 1.

The arrangement according to the present invention is schematically depicted in FIG. 1. The arrangement comprises a handset device 1, such as a Smartphone, an interface unit 2 and a hearing device 3 being one or two hearing aids or a communication device as defined above.

A wired connection 11 is used to connect the handset device 1 and the interface unit 2. The wired connection 11 may be any standardized plug and corresponding socket, as they are implemented, for example, in many portable devices such as Smartphones or other portable music playing devices. These known devices comprise a standardized socket for receiving a plug of a head set, for example. Accordingly, the wired connection 11 is designed for transmitting audio signals and therefore is able to transmit an analog signal that may comprise frequencies of the entire audible frequency range. Therefore, the upper limit of the frequency range is at 20 to 22 kHz, for example.

The wired connection 11 established between the handset device 1 and the interface unit 2 is an analog audio connection. It uses the audio output socket of the handset device 1. The wired connection 11 may be a one channel connection (mono signal) or a two channel connection (stereo signal).

The interface unit 2 comprises a first wireless transceiver unit 6 for wirelessly sending data to and wirelessly receiving data from a second wireless transceiver 10 incorporated into the hearing device 3. Thereby, a wireless connection 12 can be established between the interface unit 2 and the hearing device 3.

The hearing device 3, as shown in FIG. 1, is a monaural hearing device having one signal processing path. This signal processing path comprises an input transducer 7, such as a microphone, a signal processing unit 9 for processing an output signal of the input transducer 7 and an output transducer 8 for outputting an output signal processed by the signal processing unit 9. In addition, the signal processing unit 9 is operatively connected to the second wireless transceiver 10. Therewith, a number of tasks can be implemented such as:

transmitting a telephone call received by the handset device 1 to the hearing device 3 and its output transducer 8 via the interface unit 2;
  transmitting to the hearing device 3 an audio signal from any audio source of the handset device 1 or any audio source that is accessible by the handset device 1 via the interface unit 2;
  controlling the hearing device 1 by means of command signals generated by the handset device 1, which command signals are transmitted to the hearing device 1 via the interface unit 2, the command signals being generated by a user input on a touch screen of the handset device 1, for example.

According to the present invention, the interface unit 2 is powered by the handset device 1 via the wired connection 11 between the handset device 1 and the interface unit 2. Thereto, a power signal is generated in the handset device 1 using energy of a rechargeable battery that is present in the handset device 1. As a result thereof, no battery is needed in the interface unit 2. However, an intermediate energy buffer in the manner of a capacitor or the like may be provided to buffer energy in the interface unit 2 in order to provide sufficient energy in the interface unit 2.

It has been shown that a relatively small buffer capacitor (for example 3V/500 µF) is sufficient for providing the interface unit 2 with sufficient energy. This has been made possible by a dedicated signal course transmitted via the wired connection 11. The dedicated signal course will be explained later on in this description.

Figure 2:
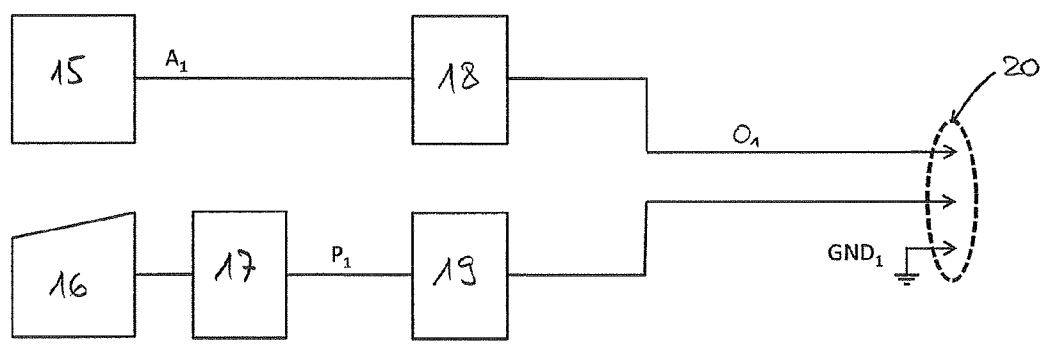

FIG. 2 schematically shows a block diagram of a handset device 1 (FIG. 1). The block diagram is simplified and only shows functional blocks that are of importance in connection with the present invention. It is pointed out that the handset device 1 may be a commercially available device, e.g. a Smartphone. As such, the hardware of such a handset device 1 is very well known. Only software adaptation is necessary that the inventive concept of the present invention can be realized.

The handset device 1 comprises an audio source 15 for providing an audio signal $A_1$. The audio source 15 may, for example, deliver sound resulting from a phone call, from any wired or wireless audio-input of the handset device 1 or from an audio file. Optionally, a filter may be used to limit the audio signal $A_1$ to a maximum frequency $F_{1max}$ which is perceived by the user. For example, it may be a fixed frequency of about 10 kHz. The amplitude of the audio signal $A_1$ should be limited to a maximum value $A_{1max}$ in order to avoid distortion. The maximum value $A_{1max}$ should be below the maximum amplitude of the output $O_1$ of the handset device 1.

It is pointed out that various amplifiers or amplification stages might be present in the signal path containing the audio signal $A_1$, in particular an amplifier driving the audio output of the handset device 1. However and to keep FIG. 1 a schematic representation, the amplitudes are assumed to be normalized to 1. This means that the maximum output signal $O_{1max}$ of the handset device 1 is assumed to be 1.

Furthermore, the handset device 1 may comprise a user input 16 via which the user of the arrangement according to the present invention may control the handset device 1 itself and, most importantly, the interface unit 2 as well as the hearing device 3.

When a user enters a command via the user input 16 of the handset device 1, a command signal $C_1$ is generated in a generation unit 17 in dependence on this user input. The command signal $C_1$ is a control signal which may contain encoded information. The command signal $C_1$ is modulated onto a frequency near the maximum output frequency of the handset device 1, for example. In case of an audio signal, this would be at about 20 kHz. The command signal $C_1$ may be encoded by using a pulse width modulation, an amplitude modulation or another known method. In one embodiment of the present invention, the command signal $C_1$ may also be seen as being incorporated into a power signal $P_1$.

As has already been mentioned above, the command signal $C_1$, the power signal $P_1$ and the audio signal $A_1$ are transmitted via a analog audio output that is standardized, such as the headset output of a Smartphone. In the following, four independent embodiments will be explained that use of known hardware components presently available in a Smartphone or the like.

In a first embodiment of the present invention, the handset device 1 and the interface unit 2 are configured to operate in a so called dual mode. This configuration is depicted in FIG. 2 and uses a standardized stereo plug having a wired connection 11 (FIG. 1) comprising three wires, namely a first wire, a second wire and a reference wire $GND_1$, the first and second wires being also called first and second audio channels. The first audio channel provides a mono audio signal $A_1$ and a second audio channel provides a power signal $P_1$. The power signal $P_1$ can constantly have the maximum amplitude allowed by the handset device 1 (FIG. 1). The user inputs or command signal $C_1$ are modulated on the power signal $P_1$. The modulation can be based on various standards, for example a pulse width modulation can be implemented. The carrier frequency may be at about 20 kHz.

An advantage of this embodiment consists in its simple structure. No frequency filters are necessary. The stereo audio capability is however sacrificed.

Figure 3:
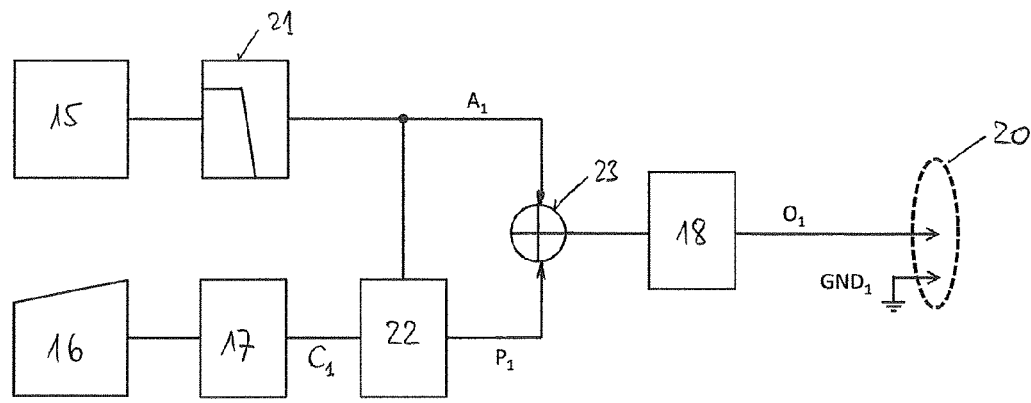

In FIG. 3, a block diagram of functional blocks implemented in the handset device 1 (FIG. 1) as a second embodiment is depicted. Therein, the handset device 1 and the interface unit 2 are configured to operate in a single channel mode.

The typical characteristic of this mode is that the audio signal $A_1$ and the power signal $P_1$ are transmitted through the same channel, namely the first wire. This is possible because the user cannot or does not need to hear the high frequency range of the audio spectrum.

An audio signal $A_1$ is provided by the audio source 15, for example representing a phone call. A user input 16 is encoded in a command signal $C_1$ that is modulated, for example, at 20 kHz. A power signal $P_1$ is generated in the power signal generating unit 22 from the command signal $C_1$ and the audio signal $A_1$. The power signal $P_1$ can be expressed in the following formula:

$$P_1 = C_1 \cdot (1-|A_1|)$$

Finally, the power signal $P_1$ is added to the audio signal $A_1$ in a superposition unit 23, thus obtaining an output signal $O_1$, namely:

$$O_1 = A_1 + P_1$$

Figure 4:
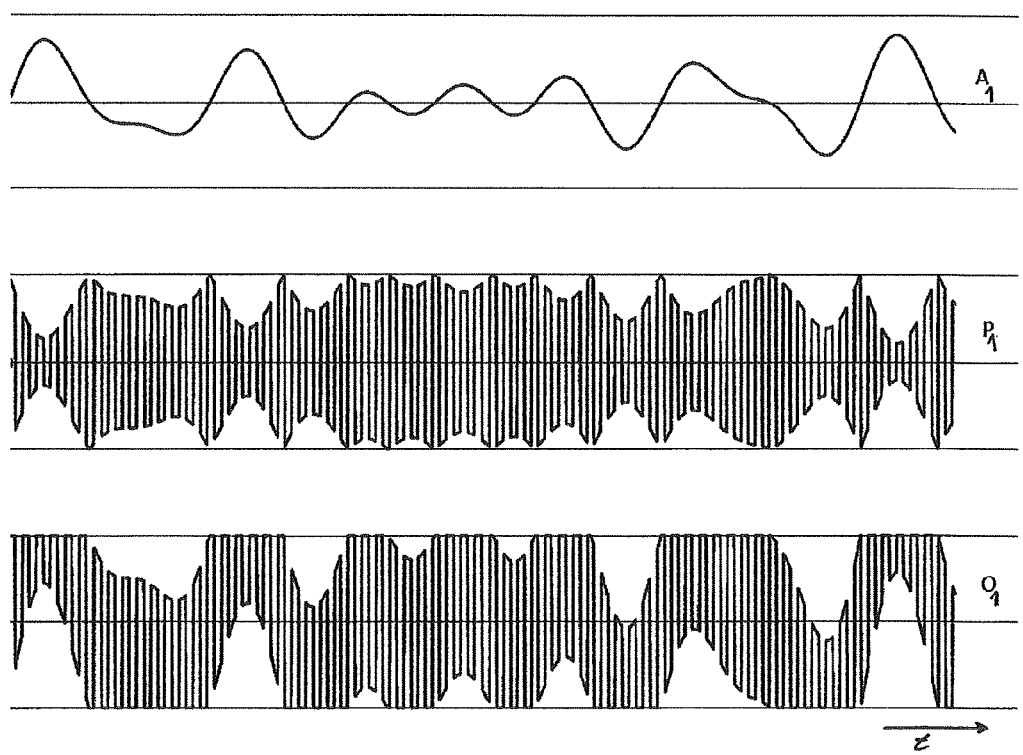
FIG. 4 shows exemplary courses for an audio signal, a power signal and their superposition according to a pre-defined scheme, FIG. 5 schematically shows a block diagram of a third embodiment of the handset device of FIG. 1, FIG. 6 schematically shows a block diagram of an interface unit with an input circuit, FIG. 7 schematically shows a block diagram of a first embodiment of the input circuit of FIG. 6, FIG. 8 schematically shows a block diagram of a second embodiment of the input circuit of FIG. 6, FIG. 9 schematically shows a block diagram of a third embodiment of the input circuit of FIG. 6.

In FIG. 4, exemplary courses in dependence of time are shown for an audio signal $A_1$, a power signal $P_1$ and an output signal $O_1$. A maximum output signal $A_{1max}$ is limited to 0.8. The audio signal $A_1$ is a low-frequency signal. The command signal $C_1$ (not shown) has a relatively high frequency. The amplitude of the command signal $C_1$ is equal to 1. The power signal $P_1$ is derived from the command signal $C_1$ and from the audio signal $A_1$ by reducing the amplitude of the command signal $C_1$ by a factor of $1-|A_1|$, $$P_1 = C_1 \cdot (1-|A_1|),$$

wherein $|A_1|$ is the absolute value of the audio signal $A_1$. The output signal $O_1$ is obtained by adding $A_1$ and $P_1$.

Since the amplitude of the power signal $P_1$ depends on the audio signal $A_1$, it is guaranteed that the output signal $O_1$ does not exceed the maximum level 1. Therewith, no distortion can arise.

A filter unit 21 (FIG. 3), which is optional and which is implemented as a low pass filter, guarantees that no high frequency signal components are present in the audio signal $A_1$. Since the power signal $P_1$ may contain a modulated command signal $C_1$, a filter unit 21 (FIG. 3) might provide more stability.

The exemplary courses depicted in FIG. 4 illustrate the superposition of the high frequency power signal $P_1$ and the lower frequency audio signal $A_1$.

The second wire of the wired connection 11 (FIG. 1) —for example in case of a stereo plug— can be used in the same manner as the first wire. This gives the possibility to process also stereo signals, which is illustrated by the embodiment depicted in FIG. 5. In this case, the audio source 15 provides an audio signal $A_1$ having two components $A_{1L}$ and $A_{1R}$:

$$A_1 = [A_{1L}, A_{1R}]$$

The components $A_{1L}$ and $A_{1R}$ of the audio signal $A_1$ are each superimposed on a corresponding power signal $P_{1L}$ and $P_{1R}$ by the corresponding superposition unit 23, 14 to obtain the audio output $O_1$ having also two components $O_{1L}$ and $O_{2R}$. A user input 16 is used to generate a command signal $C_1$ in the generation unit 17. This command signal $C_1$ is processed in the power signal generating unit 22 in order to incorporate the command signal $C_1$ in the power signal $P_{1R}$. Basically, it is sufficient to incorporate the command signal $C_1$ into one of the two components $P_{1L}$, $P_{1R}$ of the power signal $P_1$. However, the command signal $C_1$ can also be incorporated into the other component $P_{1L}$ or into both components of the power signal $P_1$. This is illustrated by a dashed connecting line between the generating unit 17 and the power signal generating unit 24.

The components $P_{1L}$, $P_{1R}$ of the power signal $P_1$ and the components $O_{1L}$, $O_{1R}$ of the output signal $O_1$ are calculated in dependence of command signal $C_1$ in the following manner, for example:

$$P_{1L}=C_1 \cdot (1-|A_{1L}|)$$

$$P_{1R}=C_1 \cdot (1-|A_{1R}|)$$

and $$O_{1L}=A_{1L}+P_{1L}$$

$$O_{1R}=A_{1R}+P_{1R}$$

Figure 5:
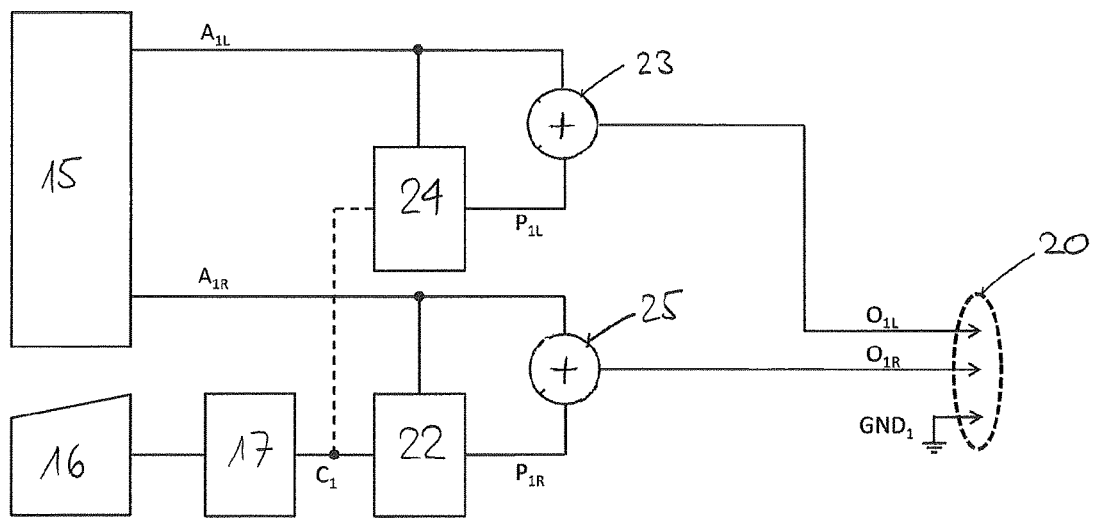

In FIG. 5, neither filters nor digital-to-analog converters are shown. However, such components might nevertheless be present but have not been shown in FIG. 5 for the sake of simplicity.

In a further embodiment of the configuration of the wired connection 11 (FIG. 1), it is proposed the use the right and left wire in a so called "bridge" mode. In this case, the power signal $P_1$ is such that one component $P_{1L}$ is inverted in respect to the other component $P_{1R}$, i.e. the right channel being the inverted left channel:

$$P_{1R}=-P_{1L}.$$

While the audio signal $A_1$ is a mono signal, the output signal $O_1$ is a stereo signal comprising a left channel output signal $O_{1L}$ and a right channel output-signal $O_{1R}$.

The "bridge" mode has the advantage that the amplitude of the power signal $P_1$ measured across the connection points $O_{1L}$ and $O_{1R}$ is twice as high as the amplitude measure at each of the connection points $O_{1L}$, $O_{1R}$ towards the reference $GND_1$. The higher amplitude results in a higher effectiveness of the energy supply to the interface unit 2.

Figure 6:
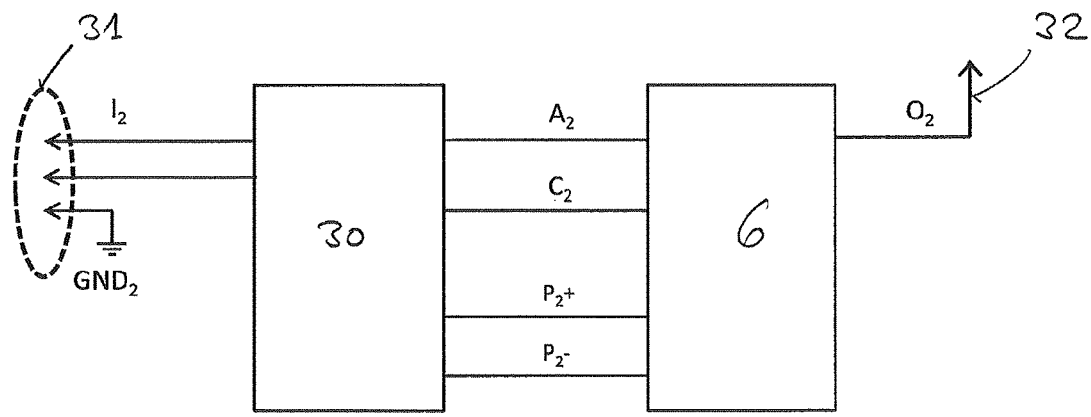

FIG. 6 schematically shows a block diagram of the interface unit 2. Generally, the interface unit 2 comprises a connector plug 31 connecting to the connector socket 20 (e.g. FIG. 2) of the handset device 1 (FIG. 1), an input circuit 30, the first wireless transceiver 6 and an antenna 32 being part of the wireless connection 12 between the interface unit 2 and the hearing device 3.

For the wireless connection 12 (FIG. 1), various wireless standards operating in the frequency range below 100 MHz may be used. In particular, said frequency range is below 17 MHz, more particular at 11 MHz. This relatively low frequency bears the advantage that no absorption of radiation by a human being needs to be taken into account. In addition, the power requirements at these low frequencies are relatively humble.

While the hardware of the handset device 1 (FIG. 1) does not need to be modified, the interface unit 2 is a dedicated piece of hardware. For the various operating modes described in connection with the handset device 1, the operating mode being implemented by software, the hardware of the interface unit 2 is adapted according to the operating mode used by the corresponding handset device 1. Of course, a generalized hardware can be used in the interface unit 2 being programmed by software to fulfill the requirements of the used operating mode.

While the interface unit 2 could be configured in a way, which allows different operating modes, it is also possible that the interface unit 2 is be made for one mode only. However, the hardware architecture of the interface unit 2 is adapted, in one embodiment, to the mode used in the handset device 1. The dedicated hardware architecture of the interface unit 2 will be further described later on.

The connector plug 31, which fits into the earphone or headset plug of the handset device 1 (e.g. a Smartphone), thus establishes a connection between the handset device 1 and the input circuit 30 of the interface unit 2. The input circuit 30 separates the audio signal $A_2$ and the command signal $C_2$ from the input signal $I_2$, i.e. the input circuits 30 has to recover the audio signal $A_1$ and the command signal $C_1$ of the handset device 1. In addition, the input circuit 30 also comprises a power circuit recovering the power signal $P_2-$ and $P_2+$ from the input signal $I_2$. The power signal $P_2-$, $P_2+$ is used to provide energy to all components of the interface unit 2. The audio signal $A_2$ and/or the command signal $C_2$ (and also the power signal $P_2-$, $P_2+$ for energy supply) are provided to the first wireless transceiver 6. At the output of the first wireless transceiver 6, an electromagnetic signal is generated and emitted by the antenna 32. The electromagnetic signal is received by a corresponding antenna (not shown) in the hearing device 3 (FIG. 1). The electromagnetic signal incorporates an adapted command signal and/or an adapted audio signal, wherein the term "adapted" means a possible adjustment to the respective signals in dependence on the requirements of the hearing device 3 as receiving device and/or in dependence on the requirements of the wireless transmission via the wireless connection 11 (FIG. 1). However, the information content of the transmitted signals is not changed.

The input circuit 30 comprises means for separating the audio input 5 which is delivered through the first connection 11 as an audio signal. The input circuit 30 further comprises power circuitry to generate a supply-voltage from the audio input 5.

The interface unit 2 further comprises the first wireless transceiver 6 or processor which may decode the input signal in order to encode user commands and audio signals to a format required by the standard implemented in the wireless connection 12 (FIG. 1).

The interface unit 2 comprises the first wireless transceiver 6, which is prepared to transmit the encoded digital audio via the wireless connection 12. This wireless connection 12 can be implemented by any suitable standard or suitable protocol. For example, the Bluetooth standard may very well be used. Another example is a proprietary protocol using a transmission range within the frequency band of 8 to 17 MHz.

Figure 7:
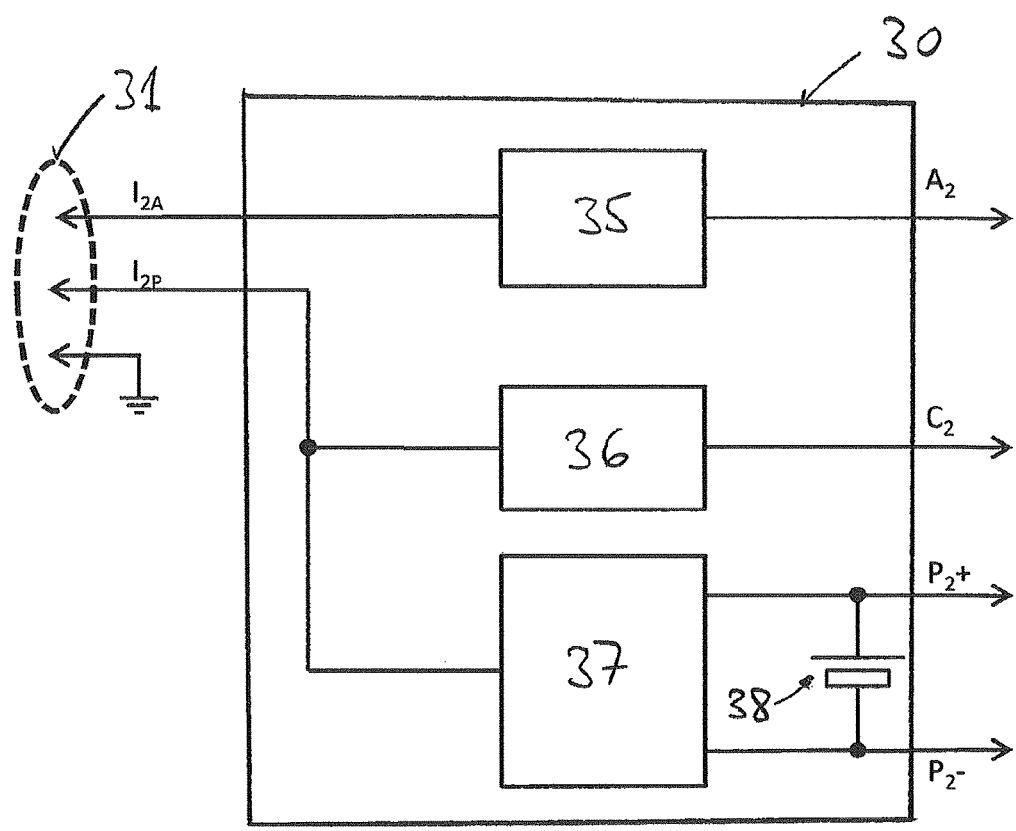

FIG. 7 shows a part of an embodiment of the interface unit 2 (FIG. 1), in particular the input circuit 30 comprising an analog-to-digital converter 35, a decoder unit 36 and a power circuit 37. The input circuit 30 is operated in the so called dual mode, which is characterized by transmitting the audio signal $A_1$ (FIG. 2, for example) via one wire. The other wire is used for transmitting the power signal, which incorporates the command signal. This configuration has been described in connection with the corresponding setup in the handset device 1 (FIG. 2). The embodiment of the interface unit 2 depicted in FIG. 7 is adapted to the dual channel mode selected in the handset device 1 as it has been described in connection with FIG. 2.

In a further embodiment of the interface unit 2, the analog-to-digital converter 35 is located in the first wireless transceiver 6 instead of the input circuit 30 as it is depicted in FIG. 7.

When the connector plug 31 is plugged in, the audio output 4 of the handset device 1 is copied to the audio input 5 of the interface unit 2 (FIG. 1), which can be expressed as follows using the reference sigs introduced in FIGS. 2 and 7:

$I_{2A}=A_1$ $I_{2P}=P_1$ $GND_2=GND_1$

The advantage of this embodiment is the simplicity of its configuration. Since signals are not combined on the same channel, no means are necessary to separate the audio signal $A_1$, $A_2$ from power signals $P_1$, $P_2$. Only the command signal $C_1$ is combined with the power signal $P_1$, and, therefore, the command signal $C_2$ must be extracted from the power signal $P_2$ by the decoder unit 36. The decoder unit 36 must be compatible with the encoding of the command signal $C_1$, which is carried out by the handset device 1. Any coding can be used, which works in a frequency range of about 20 kHz. This is necessary to provide enough power to the interface unit 2 (FIG. 1).

Figure 8:
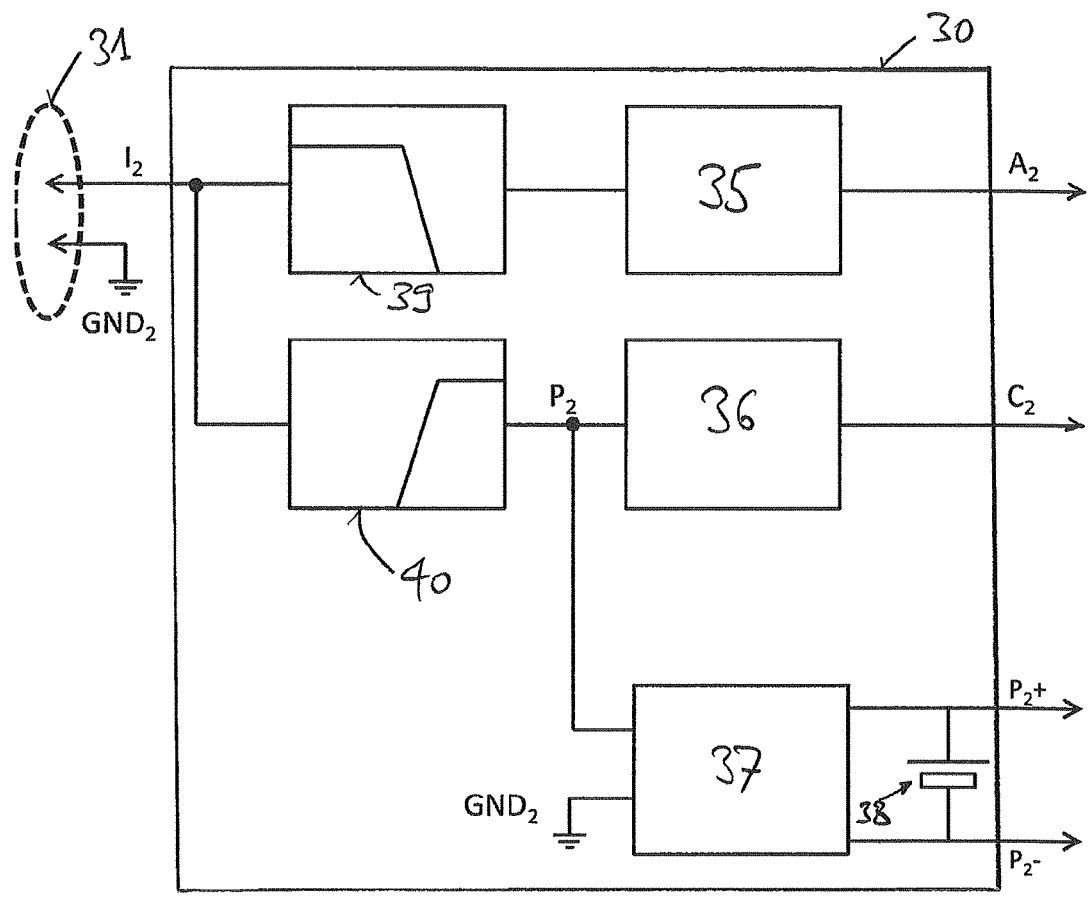

FIG. 8 shows a part of another embodiment of the interface unit 2 (FIG. 1), in particular the input circuit 30 comprising a first filter unit 39, for example a low pass filter, the analog-to-digital converter 35, a second filter unit 40, for example a high pass filter, the decoder unit 36 and the power circuit 37. The input circuit 30 is operated in the in single channel mode.

The frequency component of the part of the input signal $I_2$, which is used to power the interface unit 2, is above 10 kHz, typically at about 20 kHz. The audio output of a Smartphone used as handset device 1 is AC-(alternate current)-coupled. Therefore, energy supply to the interface unit 2 is sufficient at these frequencies. The audio signal $A_1$ can be modulated by the power signal $P_1$, as has been explained in connection with FIG. 2. As a hearing impaired person is often not sensitive to frequencies above 10 to 15 kHz, power transmission via the audio signal does not compromise the hearing impaired person. The first and the second filter units 39 and 40 can be kept simple. Furthermore, it is pointed out that frequencies above 10 to 15 kHz are not transmitted via the wireless connection 12 (FIG. 1).

Since only one audio channel (or wire) of the handset device 1 is used, the second channel (or second wire) could be used to transmit a further audio signal. Single mode on two channels could therefore potentially be used to transmit a stereo signal.

Figure 9:
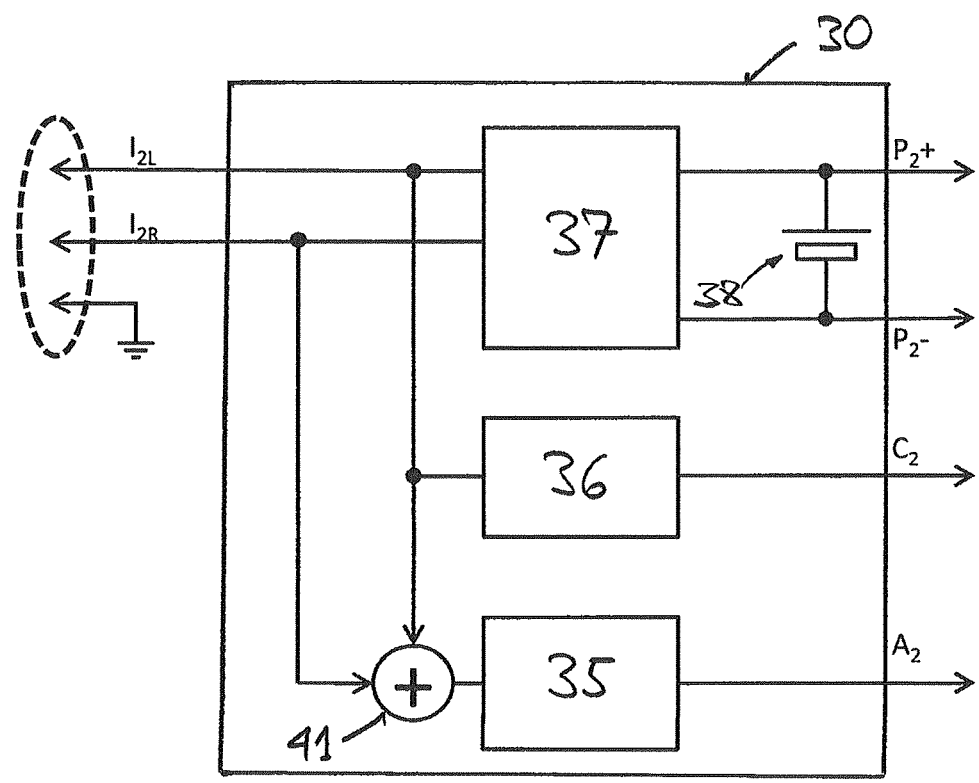

FIG. 9 shows a part of another embodiment of the interface unit 2 (FIG. 1), in particular the input circuit 30 comprising the power circuit 37, the decoder unit 36, the analog-to-digital converter 35 and a superposition unit 41. The input circuit 30 is operated in the bridge mode.

In the bridge mode, the handset device 1 again connects to the interface unit 2 (FIG. 1) via the connector plug 31, for example a standard stereo plug, such as a 3.5 mm mini plug. The connector plug 31 comprises at least three contacts: A left channel input pin (first wire), through which an input signal $I_{2L}$ is conducted into the input circuit 30, a right channel (second wire) with a signal $I_{2R}$ and a common ground signal $GND_2$. When the connector plug 31 is plugged in, audio signals are copied to the input of the interface unit 2, which can be expressed as follows using the reference sigs introduced in FIGS. 5 and 9:

$I_{2L}=O_{1L}$ $I_{2R}=O_{1R}$ $GND_2=GND_1$

The audio input $I_{1L}$ and $I_{2R}$ are connected to the input of the power circuit 37 in order to supply energy for operating the interface unit 2 (FIG. 2). The power circuit 37 may take advantage from the higher voltages. Therefore, it has been suggested to provide signal frequencies at about 20 kHz. As a result thereof, components of the power circuit 37, such as inductors or condensers, can be smaller than at frequencies of 15 kHz or lower.

The audio input $I_2$ is decoded in the decoder unit 36 in order to derive the command signal $C_2$. Since the modulation of the two power signals $P_2+$, $P_2-$ are symmetrical, the command signal $C_2$ is present in both channels of the bridge. Therefore, either of the signals of the two channels can be decoded to obtain the command signal $C_2$.

The audio input $I_{2L}$ and $I_{2R}$ are added to eliminate the power signal, because $I_{2R}=-I_{2L}$. Frequency filters are not necessary in this embodiment. The resulting analog audio signal is converted to a digital audio signal $A_2$.

Whether a transformer is needed to increase the voltage from the audio output of the handset device 1 (for example ca. 250 mV rms) to a usable value depends on the power circuit 37.

The power signal may be modulated (for example PCM encoded) in order to transmit additional command signals. Since the power signal can be transmitted at the same time as the audio signal, there is no need for large capacitors or secondary batteries as intermediate energy storage unit 38 in the interface unit 2. It has been shown that up to 15 mW can be drawn from the audio output of the handset device 1.

The power signal amplitude may depend on the actual audio signal amplitude as described in the in single mode configuration.

The handset device 1 may comprise an input contact which is used as a microphone input for connection to an external microphone or as an input for a line signal. Such an input contact can be an additional contact of the same plug, which is used to output audio signals. Such a plug would typically have 4 contacts: A reference contact, a left channel output contact a right channel output contact and a microphone input contact. Status information of the hearing device 3 or the interface unit 2 may be transmitted to the handset device 1 via such a microphone input. The status information can be modulated in order to allow the transmission through the microphone input. Any modulation technique can be used. If the microphone input is at the same time also used for transmission of audio the frequency ranges of the audio signal and frequency range for the transmission of modulated status information should not overlap. Thereto, a low frequency range may be used to transmit status information from the interface unit 2 to the handset device 1, if the transmission of this information doesn't require a high bandwidth.

Figure 10:
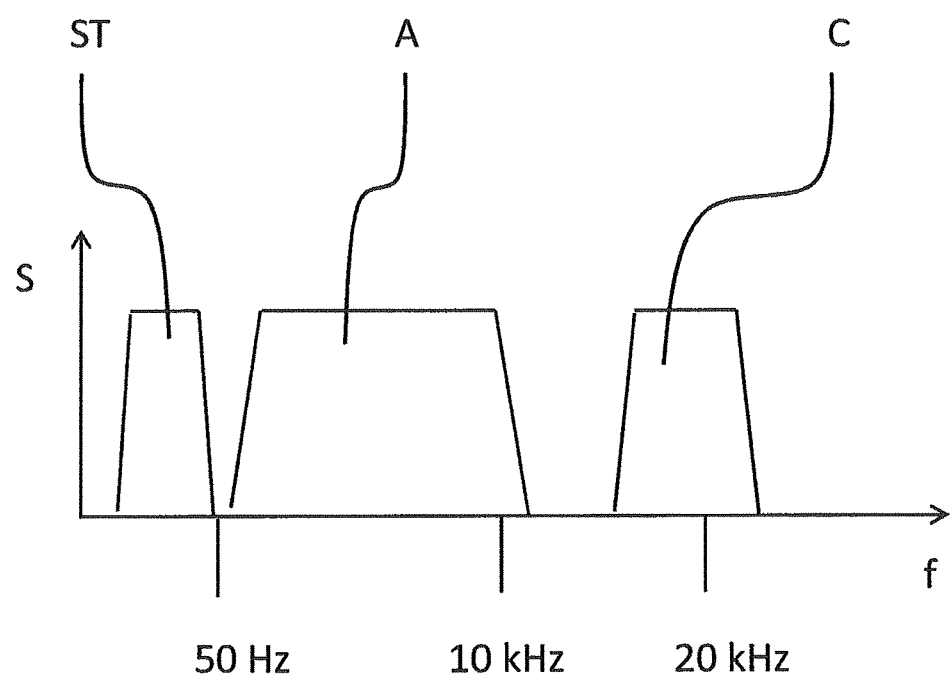
FIG. 10 shows a possible frequency distribution of an output signal of the handset device of FIG. 1.

FIG. 10 shows a possible frequency distribution for an audio output 4 (FIG. 1) of a Smartphone as handset device 1. Since the audio signal A and the power signal with modulated command signal C use different frequency ranges, they can be transmitted in parallel. This is particularly possible for hearing devices 3 that are used for hearing impaired, because not the complete frequency range available is used for transmitting the audio signal. Therefore, the frequency range used for the audio signal for such hearing device users can be limited.

However, it is also possible to use the inventive concept for communication devices, where speech transmission is the principle task and a frequency-range up to about 10 kHz is sufficient for keeping the speech signal at a sufficient intelligibility level.

For example, the power signal with modulated command signal C are at 20 kHz, the audio signal A is in the range of 50 Hz to 10 kHz, and a status information ST from the hearing device 3, that is transmitted via the microphone input, is below 50 Hz.

The frequency of the power signal P should be half of the sampling frequency used by the handset device. For example, for a sampling rate of 44.1 kHz, the highest frequency for the power signal P can be at 22.05 kHz.

The invention claimed is:

1. A system comprising:
   a handset device with an audio output, the handset device configured to
     transmit, to an interface unit separate from the handset device and by way of a wired connection connecting the audio output of the handset device with an audio input of the interface unit, a power signal configured to power the interface unit; and
     transmit, to the interface unit, a command signal and an audio signal, at least one of the command signal and the audio signal transmitted by way of the wired connection, and the audio signal and at least one of the command signal and the power signal having pre-assigned and non-overlapping frequency ranges;
   wherein a first wireless transceiver included in the interface unit is used to transmit at least one of the command signal and the audio signal to a hearing device by way of a wireless connection wirelessly interconnecting the first wireless transceiver with a second wireless transceiver of the hearing device, the hearing device separate from the interface unit and the handset device and comprising an input transducer, an output transducer, the second wireless transceiver, and a signal processing unit operatively connected to the input transducer, the output transducer, and the second wireless transceiver.

2. The system of claim 1, wherein the handset device is a Smartphone and the audio output of the handset device is an AC-coupled analog audio output of the Smartphone.

3. The system of claim 1, wherein the wired connection connecting the audio output of the handset device with the audio input of the interface unit uses a standardized audio plug and a corresponding socket.

4. The system of claim 1, wherein:
   the wired connection connecting the audio output of the handset device with the audio input of the interface unit comprises a single wire and a reference wire; and
   the handset device is configured to transmit the power signal and the at least one of the command signal and the audio signal to the interface unit by way of the wired connection over the single wire and the reference wire.

5. The system of claim 1, wherein:
   the wired connection connecting the audio output of the handset device with the audio input of the interface unit comprises a first wire, a second wire, and a reference wire;
   the handset device is configured to transmit the audio signal to the interface unit over the first wire and the reference wire; and
   the handset device is configured to transmit the power signal and the command signal to the interface unit over the second wire and the reference wire.

6. The system of claim 1, wherein:
   the wired connection connecting the audio output of the handset device with the audio input of the interface unit comprises a first wire, a second wire, and a reference wire;
   the handset device is configured to transmit the power signal and the at least one of the command signal and the audio signal to the interface unit over the first wire and the reference wire; and
   the handset device is further configured to transmit a further power signal and at least one of a further audio signal and the command signal to the interface unit over the second wire and the reference wire.

7. An interface unit comprising:
   an audio input configured to connect to a handset device separate from the interface unit via a wired connection;
   a wireless transceiver configured to connect to a hearing device separate from the interface unit and the handset device via a wireless connection; and
   an input circuit operatively connected to the audio input and to the wireless transceiver;
   wherein the interface unit is configured to
     receive, from the handset device by way of the wired connection, a power signal configured to provide electrical energy to the interface unit,
     receive, from the handset device, a command signal and an audio signal, wherein at least one of the command signal and the audio signal is received by way of the wired connection, and wherein the audio signal and at least one of the command signal and the power signal have preassigned and non-overlapping frequency ranges,
     separate, using the input circuit, the power signal from the at least one of the command signal and the audio signal received by way of the wired connection, and
     provide, to the wireless transceiver, at least one of the command signal and the audio signal.

8. The interface unit of claim 7, wherein the interface unit is further configured to transmit, to the hearing device by way of the wireless connection and using the wireless transceiver, the at least one of the command signal and the audio signal provided to the wireless transceiver.

9. The interface unit of claim 7, wherein the handset device is a Smartphone and the audio output of the handset device is an AC-coupled analog audio output of the Smartphone.

10. The interface unit of claim 7, wherein the audio input is a standardized audio plug.

11. The interface unit of claim 7, wherein:
    the wired connection connecting the audio input to the handset device comprises a single wire and a reference wire; and
    the interface unit is configured to receive the power signal and the at least one of the command signal and the audio signal by way of the wired connection over the single wire and the reference wire.

12. The interface unit of claim 7, wherein:
    the wired connection connecting the audio input to the handset device comprises a first wire, a second wire, and a reference wire;
    the interface unit is configured to receive the audio signal over the first wire and the reference wire; and
    the interface unit is configured to receive the power signal and the command signal over the second wire and the reference wire.

13. The interface unit of claim 7, wherein:
    the wired connection connecting the audio input to the handset device comprises a first wire, a second wire, and a reference wire;
    the interface unit is configured to receive the audio signal, the power signal, and the command signal over the first wire and the reference wire; and the interface unit is further configured to receive a further audio signal and a further power signal configured to power the interface unit over the second wire and the reference wire.

14. The interface unit of claim 7, wherein:
the audio signal and at least one of the command signal and the power signal have pre-assigned non-overlapping frequency ranges.

15. A method comprising:
transmitting, by a handset device with an audio output to an interface unit separate from the handset device and by way of a wired connection connecting the audio output of the handset device with an audio input of the interface unit, a power signal configured to power the interface unit; and
transmitting, by the handset device to the interface unit, a command signal and an audio signal, at least one of the command signal and the audio signal transmitted by way of the wired connection, and the audio signal and at least one of the command signal and the power signal having pre-assigned and non-overlapping frequency ranges;
wherein a first wireless transceiver included in the interface unit is used to transmit at least one of the command signal and the audio signal to a hearing device by way of a wireless connection wirelessly interconnecting the first wireless transceiver with a second wireless transceiver of the hearing device, the hearing device separate from the interface unit and the handset device and comprising an input transducer, an output transducer, the second wireless transceiver, and a signal processing unit operatively connected to the input transducer, the output transducer, and the second wireless transceiver.

16. The method of claim 15, wherein the handset device is a Smartphone and the audio output of the handset device is an AC-coupled analog audio output of the Smartphone.

17. The method of claim 15, wherein the wired connection connecting the audio output of the handset device with the audio input of the interface unit uses a standardized audio plug and a corresponding socket.

18. The method of claim 15, wherein:
the wired connection connecting the audio output of the handset device with the audio input of the interface unit comprises a single wire and a reference wire; and
the transmitting, by the handset device, of the power signal and of the at least one of the command signal and the audio signal to the interface unit by way of the wired connection is performed over the single wire and the reference wire.

19. The method of claim 15, wherein:
the wired connection connecting the audio output of the handset device with the audio input of the interface unit comprises a first wire, a second wire, and a reference wire;
the transmitting, by the handset device, of the audio signal to the interface unit is performed over the first wire and the reference wire; and
the transmitting, by the handset device, of the power signal and the command signal to the interface unit is performed over the second wire and the reference wire.

20. The method of claim 15, wherein:
the wired connection connecting the audio output of the handset device with the audio input of the interface unit comprises a first wire, a second wire, and a reference wire;
the transmitting, by the handset device, of the power signal and of the at least one of the command signal and the audio signal to the interface unit is performed over the first wire and the reference wire; and
the method further comprises transmitting, by the handset device, a further power signal and at least one of a further audio signal and the command signal to the interface unit over the second wire and the reference wire.

* * * * *